(12) United States Patent
Hart

(10) Patent No.: US 11,345,290 B2
(45) Date of Patent: May 31, 2022

(54) MOUNTING ARRANGEMENT

(71) Applicant: ZF FRIEDRICHSHAFEN AG, Friedrichshafen (DE)

(72) Inventor: Michael A. Hart, Dexter, MI (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/037,943

(22) Filed: Sep. 30, 2020

(65) Prior Publication Data

US 2022/0097622 A1 Mar. 31, 2022

(51) Int. Cl.
*B60R 11/04* (2006.01)

(52) U.S. Cl.
CPC .................................... *B60R 11/04* (2013.01)

(58) Field of Classification Search
None
See application file for complete search history.

(56) References Cited

U.S. PATENT DOCUMENTS

| 7,111,996 | B2 | 9/2006 | Seger et al. | |
|---|---|---|---|---|
| 2007/0164188 | A1* | 7/2007 | Mordau | B60S 1/0822 248/503 |
| 2018/0239223 | A1* | 8/2018 | Blake, III | G03B 17/561 |
| 2019/0394365 | A1* | 12/2019 | Blake, III | H04N 5/2253 |
| 2020/0047683 | A1* | 2/2020 | Kasai | H04N 5/2253 |
| 2020/0262361 | A1* | 8/2020 | Ueta | G03B 17/561 |
| 2021/0024012 | A1* | 1/2021 | Inayoshi | B60R 11/04 |
| 2021/0284082 | A1* | 9/2021 | Tokito | B60R 11/00 |

\* cited by examiner

*Primary Examiner* — Rebecca A Volentine
(74) *Attorney, Agent, or Firm* — Tarolli, Sundheim, Covell & Tummino LLP

(57) ABSTRACT

A driver assist system for a vehicle includes a camera having a housing and a lens extending from the housing. A mounting bracket has a mounting wall connectable with a vehicle window and the camera. The mounting wall has a first mounting surface configured to face the vehicle window, and a second mounting surface configured to face away from the vehicle window. At least one bracket wall extends from the second mounting surface and has an edge that engages the housing. At least one resilient arm extends from the at least one bracket wall and engages the housing. At least one resilient tab extends from the mounting wall and engages the housing. The at least one resilient tab urges the housing into engagement with the edge and maintains the housing engaged to the edge.

20 Claims, 3 Drawing Sheets

MOUNTING ARRANGEMENT

FIELD OF THE INVENTION

The present invention is directed to a mounting arrangement for a driver assist system and, more particularly, to a mounting arrangement for a driver assist system that is mounted to a vehicle window.

BACKGROUND OF THE INVENTION

Vehicle driver assist systems that use a camera to monitor the environment surrounding the vehicle are known. For example, one particular type of driver assist system monitors the area in front of the vehicle and uses a forward looking camera. It is common to mount a forward looking driver assist system to the front windshield of the vehicle. Such a forward looking driver assist system can aid a driver in the operation of a motor vehicle by providing operational information such as a potential collision, lane or roadway departure, location of pedestrians, road sign information, etc. Driver assist systems could also be mounted to other vehicle locations such as the rear window or a side window. Data from the driver assist system is provided to other vehicle systems to provide the driver with a warning, haptic or tactile feedback, and/or autonomous control of the vehicle.

SUMMARY OF THE INVENTION

According to one aspect, a driver assist system for a vehicle can include a camera. The camera can have a housing and a lens extending from the housing. A mounting bracket can have a mounting wall connectable with a vehicle window and the camera. The mounting wall can have a first mounting surface configured to face the vehicle window, and a second mounting surface configured to face away from the vehicle window. At least one bracket wall can extend from the second mounting surface and can have an edge that engages the housing. At least one resilient arm can extend from the at least one bracket wall and can engage the housing. At least one resilient tab can extend from the mounting wall and can engage the housing. The at least one resilient tab can urge the housing into engagement with the edge and can maintain the housing engaged to the edge.

According to another aspect, alone or in combination with any other aspect, a driver assist system for a vehicle can include a camera. The camera can have a housing and a lens extending from the housing. The housing can have a plurality of notches therein. A mounting bracket can have a mounting wall connectable with a vehicle window and the camera. The mounting wall can have a first mounting surface configured to face the vehicle window, and a second mounting surface configured to face away from the vehicle window. A plurality of bracket walls can extend from the second mounting surface. Each bracket wall can have an edge that engages the housing. The driver assist system can have a plurality of projections. Each projection can extend from an associated edge of an associated bracket wall into an associated notch of the housing. The driver assist system can have a plurality of resilient arms. Each resilient arm can extend from an associated bracket wall and can engage the housing. A plurality of resilient tabs can extend from the mounting wall and can engage the housing. The resilient tabs can urge the housing into engagement with the edges and can maintain the housing engaged to the edges.

BRIEF DESCRIPTION OF THE DRAWINGS

The foregoing and other features of the invention will become apparent to one skilled in the art to which the invention relates upon consideration of the following description of the invention with reference to the accompanying drawings, in which.

DETAILED DESCRIPTION OF THE INVENTION

Figure 1:
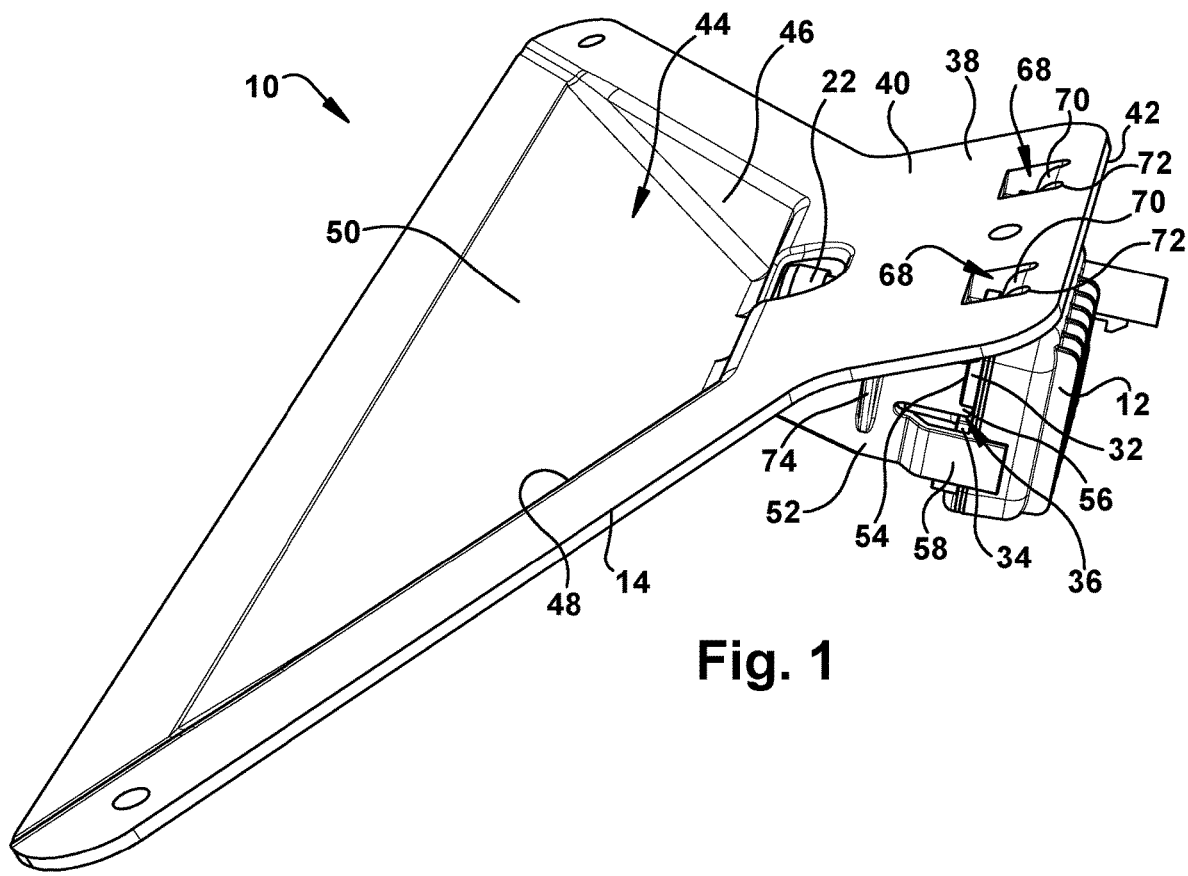
FIG. 1 is a schematic perspective side view of a driver assist system constructed in accordance with the present invention.

A driver assist system 10 constructed in accordance with the present disclosure is shown in FIG. 1. The driver assist system 10 may be a forward looking system and may be mounted to a window, such as a front windshield, of a vehicle. The driver assist system 10 views the environment forward of the vehicle and analyzes monitored information for vehicle functions, such as lane keeping, roadway departures, pedestrian information, road sign information, etc. The analyzed information is then further processed and used by vehicle control systems and/or warning systems. Those skilled in the art will appreciate that the present disclosure is applicable to other driver assist systems such as a rearward facing system for monitoring the environment rearward of the vehicle or a sideward facing system for monitoring the environment sideward of the vehicle.

Figure 2:
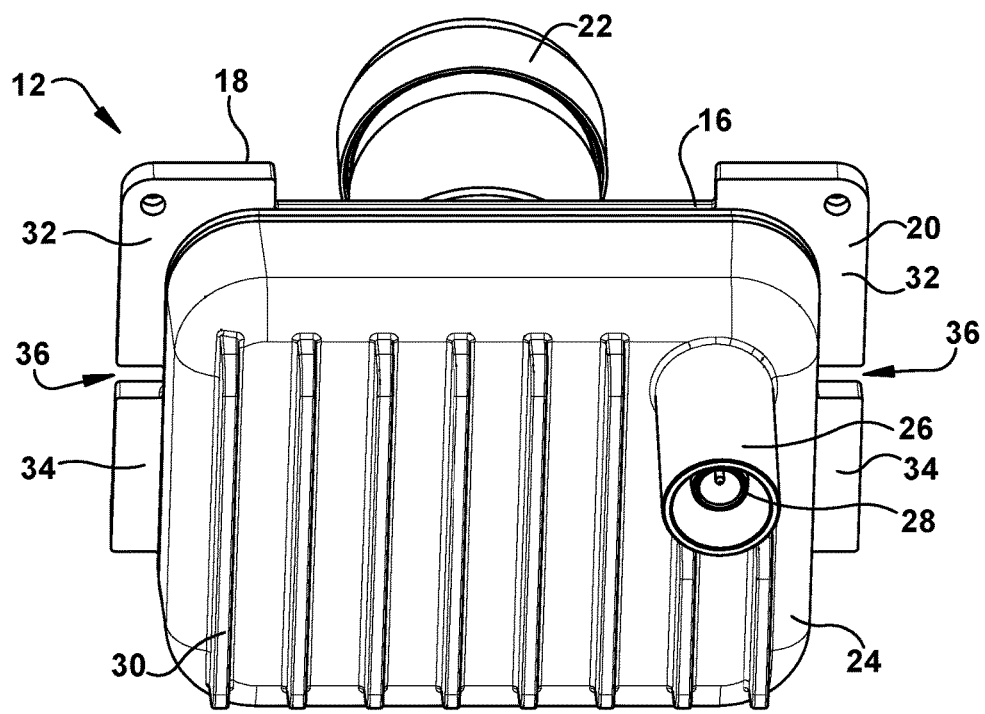
FIG. 2 is schematic rear view of a camera of the driver assist system of FIG. 1.

The driver assist system 10 includes a camera 12 or other sensor secured in a mounting bracket 14. As shown in FIG. 2, the camera 12 includes a housing 16 having first and second opposite surfaces 18, 20. A camera lens 22 extends from the first surface 18. A cover 24 is connected, such as by welding, to the second surface 20. At least one imaging sensor (not shown) and data processing circuitry (not shown) for capturing and processing any image within the field of view of the camera 12 may be located in the housing 16. The cover 24 includes a connector shroud 26 for covering a connector 28 that connects the sensor and/or data processing circuitry with other vehicle systems. The cover 24 can also include one or more cooling fins 30 that radiate heat away from the camera 12 to cool the camera.

The housing 16 includes at least one upper or first tab 32. It is contemplated that the housing 16 may include any desired number of upper tabs 32 and, preferably, two upper tabs on opposite sides of the lens 22. The housing 16 also includes at least one lower or second tab 34. It is contemplated that the housing 16 may include any desired number of lower tabs 34 and, preferably, two lower tabs on opposite sides of the housing. The lower tabs 34 may be separated from the upper tabs 32 by one or more notches 36, preferably, two notches, in the housing 16. When the camera 12 is connected to the window by the mounting bracket 14, the lower tabs 34 are spaced further from the window than the upper tabs 32.

The mounting bracket 14 is connectable to the window in any desired manner, such as, by an adhesive. As shown in FIG. 1, the mounting bracket 14 has a mounting wall 38 that is connectable to the window. The mounting wall 38 has a first mounting surface 40 configured to face the window and a second mounting surface 42 configured to face away from the window. A camera viewing window 44 in the mounting bracket 14 is defined by spaced apart first and second sidewalls 46, 48 and a bottom wall 50 that extends between and interconnects the first and second sidewalls. The first and second sidewalls 46, 48 extend from the first mounting surface 40 away from the window when the mounting bracket 14 is connected to the window. As shown in FIG. 1, when the camera 12 is attached to the mounting bracket 14, the lens 22 has an unobstructed field of view through the camera viewing window 44.

Figure 3:
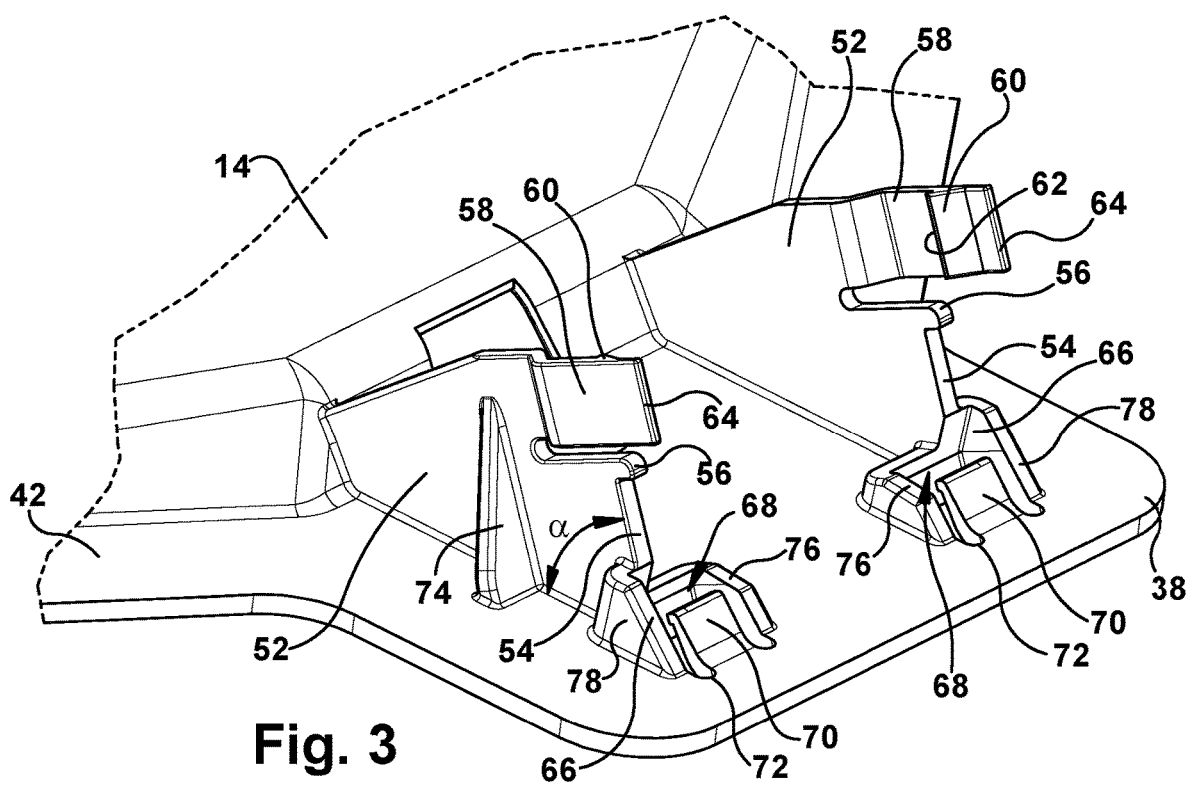
FIG. 3 is a schematic perspective bottom view of a mounting bracket of the driver assist system of FIG. 1.
Figure 4:
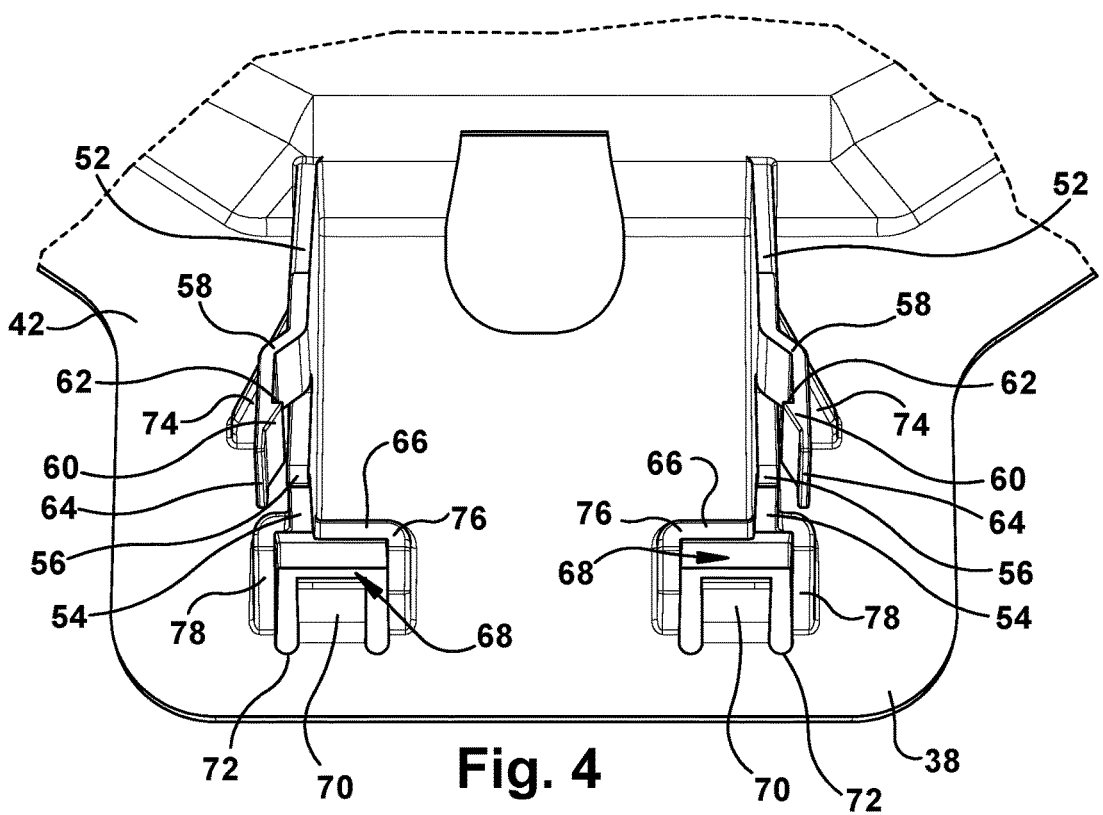
FIG. 4 is a schematic bottom view of the mounting bracket of the driver assist system of FIG. 1.

As shown in FIGS. 1 and 3-4, the mounting bracket 14 also includes at least one bracket wall 52 that extends from the second mounting surface 42 away from the window when the mounting bracket is connected to the window. The mounting bracket 14 is shown as having two bracket walls 52 that extend generally parallel to each other on opposite sides of the camera 12 when the camera is connected to the mounting bracket. Each bracket wall 52 includes an edge 54, such as a rearward facing edge. The edges 54 engage the upper tabs 32 when the camera 12 is secured to the mounting bracket 14. As shown in FIGS. 3-4, the edges 54 may extend at an angle α, such as at an acute angle, with respect to the second mounting surface 42. Therefore, the camera 12 extends at a desired angle with respect to the mounting bracket 14 and/or the window when engaging the edges. At least one of the edges 54, preferably each of the edges, includes a projection 56. Each projection 56 is received in an associated notch 36 of the housing 16. Although the mounting bracket 14 is described as having at least one projection 56 for being received in an associated notch 36 of the housing 16, it is contemplated that the mounting bracket may have any desired number of projections that extend into notches on the housing.

A resilient arm 58 having a detent 60 extends from an associated bracket wall 52. The mounting bracket 38 is shown as having a resilient arm 58 with detent 60 extending from each bracket wall 52. It is contemplated, however, that the mounting bracket 14 may include any desired number of resilient arms 58 having any desired number of detents 60. As shown in FIGS. 3-4, the resilient arms 58 may be spaced from the edges 54. The detents 60 have stop surfaces 62 that extend transversely, such as at a ninety (90) degree angle, with respect to the portions of the resilient arms 58 from which the detents extend. The stop surfaces 62 engage the lower tabs 34 when the camera 12 is secured to the mounting bracket 14.

As shown in FIG. 3, each resilient arm 58 may have a contact extension 64 that extends from the detent 60. The contact extensions 64 may have substantially flat surfaces. A user can easily move the resilient arms 58 by engaging the contact extensions to disconnect the camera 12 from the mounting bracket 14.

As shown in FIG. 4, each resilient arm 58 may extend at least partially outward, i.e., away from each other and away from an opposing bracket wall 52. Because of this outward extension, a portion of each resilient arm 58 may be spaced further from an opposing bracket wall 52 than the resilient arm's associated bracket wall. Accordingly, the bracket walls 52 may be spaced closer to one another than portions of the resilient arms 58.

As shown in FIGS. 3-4, at least one U-shaped receiving wall 66 extends from the second mounting surface 42 away from the window when the mounting bracket 14 is connected to the window. The mounting bracket 14 is shown as having two U-shaped receiving walls 66 on opposite sides of the second mounting surface 42. Each U-shaped receiving wall 66 may be formed integrally with an associated bracket wall 52. The U-shaped receiving walls 66 define receiving openings 68 for receiving the upper tabs 32. As shown in FIGS. 1 and 3-4, the receiving openings 68 may extend through the mounting wall 38.

The mounting bracket 14 may further include at least one resilient tab 70 that extends from the second mounting surface 42. The at least one resilient tab 70 engages the upper tab 32 when the camera 12 is secured to the mounting bracket. It is contemplated that the housing 16 may include any desired number of resilient tabs 70 and, preferably, two resilient tabs on the second mounting surface 42. Each resilient tab 70 may extend from the mounting wall 38, such as from an edge 72 that helps define an associated receiving opening 68. Each resilient tab 70 extends away from the window when the mounting bracket 14 is connected to the window. The resilient tabs 70 are spaced from the bracket walls 52 and are adjacent the receiving openings 68. The resilient tabs 70 may extend into the receiving openings.

The mounting bracket 14 may also have stiffening ribs 74. The stiffening ribs 74 may extend between the bracket walls 52 and the second mounting surface 42. The stiffening ribs 74 help prevent the bracket walls 52 from flexing.

Figure 5:
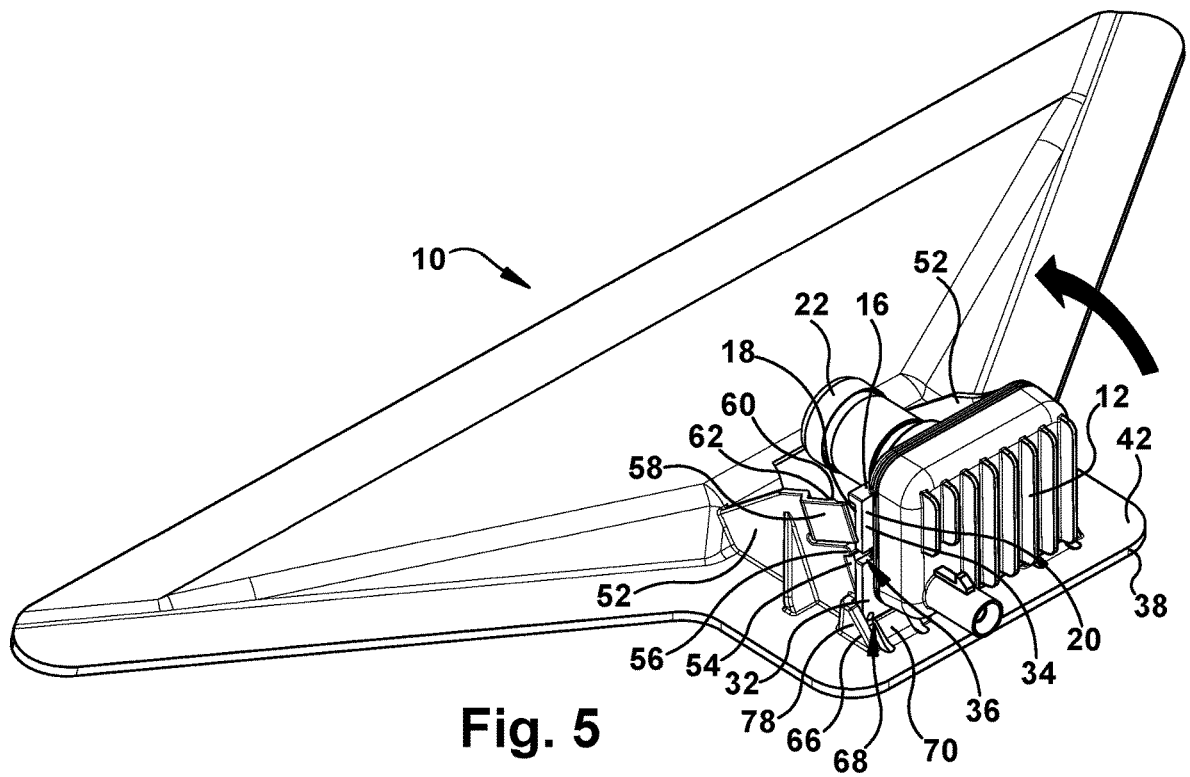
FIGS. 5-6 show the camera being secured to the mounting bracket of the driver assist system of FIG. 1.
Figure 6:
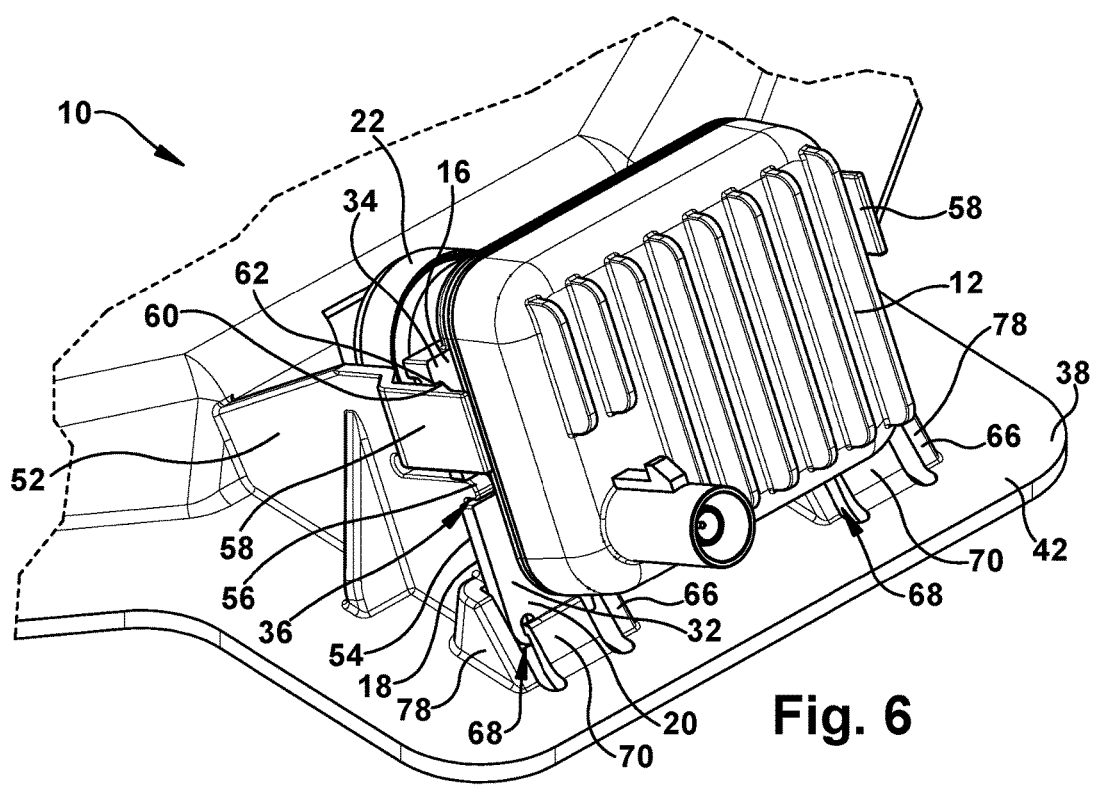

FIGS. 5-6 depict an example sequence for securing the camera 12 to the mounting bracket 14. As shown in FIG. 5, the upper tabs 32 are inserted into the receiving openings 68 with the lower tabs 34 spaced from the detents 60. Lower surfaces 76 (see FIGS. 3-4) of the U-shaped receiving walls 66, i.e., surfaces of the U-shaped receiving walls that face away from the window when the mounting bracket 14 is connected to the window, may engage the housing 16. Outer sidewalls 78 of the U-shaped receiving walls 66 may engage the upper tabs 32 to at least partially prevent sideways movement of the camera 12 once the upper tabs are received in the receiving openings 68. The lower surfaces 76 and outer sidewalls 78 of the U-shaped receiving walls 66 may thus help align the camera 12 relative to the mounting bracket 14 when the upper tabs 32 are inserted into the receiving openings 68.

After inserting the upper tabs 32 into the receiving openings 68, the camera 12 may be pivoted relative to the mounting bracket 14 from the position shown in FIG. 5 toward the position shown in FIG. 6. The camera 12 is pivoted until the first surface 18 of the housing 16 at the upper tabs 32 engages the edges 54 of the bracket walls 52. The angle α at which the edges 54 extend with respect to the second mounting surface 42 prevents the camera lens 22 from being pivoted into engagement with the window and/or too close to the window. Thus, when the upper tabs 32 engage the edges 54, the camera 12 is at a desirable angle with respect to the window and/or the mounting bracket 14 for monitoring the environment forward of the vehicle.

The upper tabs 32 flex the resilient tabs 70 away from the bracket walls 52 as the camera 12 pivots. The resilient tabs 70 may remain flexed even after the housing 16 engages the edges 54. The resilient tabs 70 apply a force onto the second surface 20 of the housing 16 at the upper tabs 32 that urges the upper tabs into engagement with the edges 54. The resilient tabs 70 thus help maintain the camera 12 attached to the mounting bracket 14 at a desired orientation relative to the mounting bracket.

The projections 56 are received in the notches 36 as the camera 12 pivots. The projections 56 may engage at least one of the upper and lower tabs 32, 34 and prevent the camera 12 from being moved toward or away from second mounting surface 42 and/or the window when the camera is secured to the window by mounting bracket 14. For example, the projections 56 may engage the upper tabs 32 and prevent the camera 12 from being moved away from the second mounting surface 42 and/or the window when the camera is secured to the window. The projections 56 thus help maintain the camera 12 attached to the mounting bracket 14 in a desired orientation with respect to the mounting bracket and/or the window.

The lower tabs 34 move toward the detents 60 as the camera 12 is pivoted relative to the mounting bracket 14. The resilient arms 58 move outward (i.e., away from one another) when the lower tabs 34 engage the detents 60 upon pivoting. The lower tabs 34 are pivoted with respect to the mounting bracket 14 until the lower tabs slide past the detents 60. The lower tabs 34 snap into the resilient arms 58 after sliding past the detents 60 to connect the housing 16 to the mounting bracket 14. The second surface 20 of the housing 16 at the lower tabs 34 may engage the stop surfaces 62 when the camera 12 is attached to the mounting bracket 14. The stop surfaces 62 help attach the camera 12 to the mounting bracket 14.

Because of the outward extension of the resilient arms 58, the resilient arms and the detents 60 do not engage the first surface 18 of the housing 16 at the lower tabs 34 when the camera 12 is secured to the mounting bracket 14. The bracket walls 52 also do not engage the first surface 18 of the housing 16 at the lower tabs 34. The first surface 18 of the housing 16 only engages the edges 54 of the bracket walls 52 when the camera 12 is secured to the mounting bracket 14. It is contemplated, however, that the first surface 18 of the housing 16 may also engage one or more of the resilient arms 58, detents 60 and bracket walls 52 at the lower tabs 34.

From the above description of the invention, those skilled in the art will perceive improvements, changes and modifications. Such improvements, changes and modifications within the skill of the art are intended to be covered by the appended claims.

Having described the invention, the following is claimed:

1. A driver assist system for a vehicle, comprising:
   a camera having a housing that includes a first surface from which a lens extends and a second surface opposite the first surface, the housing including a plurality of first tabs separated from at least one second tab by a plurality of notches in the housing, the first tabs being configured to be spaced closer to a vehicle window than the at least one second tab;
   a mounting bracket having a mounting wall connectable with the vehicle window, the mounting wall having a first mounting surface configured to face the vehicle window, and a second mounting surface configured to face away from the vehicle window, a plurality of bracket walls extending from the second mounting surface, each bracket wall having an edge that engages the first surface of the housing such that the first surface of the housing is engaged by only the edges of the bracket walls;
   a plurality of resilient arms, each resilient arm extending from an associated bracket wall and having a detent that engages the second surface of the housing at the at least one second tab; and
   a plurality of resilient tabs extending from the mounting wall, each resilient tab engaging the second surface of the housing at an associated first tab, urging the first surface of the housing at the associated first tab into engagement with an associated edge of an associated bracket wall and maintaining the associated first tab engaged to the associated edge.

2. The driver assist system recited in claim 1, wherein at least one of the bracket walls has a projection extending into an associated notch in the housing.

3. The driver assist system recited in claim 1, wherein the detents have stop surfaces that engages the second surface of the housing.

4. The driver assist system recited in claim 3, wherein each stop surface is substantially flat and extends at a ninety (90) degree angle with respect to a portion of an associated resilient arm.

5. The driver assist system recited in claim 3, wherein the resilient arms extend away from each other, portions of the resilient arms being spaced apart by a distance greater than a distance that the bracket walls are spaced apart.

6. The driver assist system recited in claim 1, wherein each edge extends at an acute angle with respect to the second mounting surface to prevent the lens from engaging the vehicle window.

7. The driver assist system recited in claim 1, further comprising a plurality of U-shaped receiving walls extending from the second mounting surface and defining receiving openings in which the first tabs are received, each resilient tab extending into an associated receiving opening and engaging an associated first tab received in the associated receiving opening.

8. The driver assist system recited in claim 7, wherein each U-shaped receiving wall includes a surface that is configured to face away from the vehicle window and engage an associated first tab.

9. The driver assist system recited in claim 7, wherein each U-shaped receiving wall includes a sidewall that is engageable with an associated first tab to at least partially prevent movement of the camera relative to the mounting bracket when the first tabs are received in the receiving openings.

10. The driver assist system recited in claim 1, further comprising a camera viewing window in the mounting bracket defined by spaced apart first and second sidewalls and a bottom wall that extends between and interconnects the first and second sidewalls, the first and second sidewalls extending from the first mounting surface away from the vehicle window when the mounting bracket is connected to the vehicle window, the lens having an unobstructed field of view through the camera viewing window when the camera is attached to the mounting bracket.

11. A driver assist system for a vehicle, comprising:
   a camera having a housing and a lens extending from the housing, the housing having a plurality of notches therein, the housing including a plurality of first tabs separated from at least one second tab by the notches, the first tabs being configured to be spaced closer to a vehicle window than the at least one second tab;
   a mounting bracket having a mounting wall connectable with the vehicle window, the mounting wall having a first mounting surface configured to face the vehicle window, and a second mounting surface configured to face away from the vehicle window, a plurality of bracket walls extending from the second mounting surface, each bracket wall having an edge that engages an associated first tab;
   a plurality of resilient arms, each resilient arm extending from an associated bracket wall and engaging the at least one second tab;
   a plurality of resilient tabs extending from the mounting wall, each resilient tab engaging an associated first tab and urging the associated first tab into engagement with an associated edge of an associated bracket wall; and a plurality of receiving walls extending from the second mounting surface and defining receiving openings in which the first tabs are received, each resilient tab extending into an associated receiving opening and engaging an associated first tab received in the associated receiving opening.

12. The driver assist system recited in claim 11, wherein each resilient arm includes a detent, the detents having stop surfaces that engage the housing.

13. The driver assist system recited in claim 12, wherein the resilient arms extend away from each other, portions of the resilient arms being spaced apart by a distance greater than a distance that the bracket walls are spaced apart.

14. The driver assist system recited in claim 13, wherein a first surface of the housing substantially engages only the edges when the camera is secured to the mounting bracket, the detents engaging a second surface of the housing when the camera is secured to the mounting bracket, the second surface being opposite the first surface.

15. The driver assist system recited in claim 11, wherein each of the edges extends at an acute angle with respect to the second mounting surface to prevent the lens from engaging the vehicle window.

16. The driver assist system recited in claim 11, wherein the receiving walls are U-shaped receiving walls.

17. The driver assist system recited in claim 1, further comprising a plurality of receiving walls extending from the second mounting surface and defining receiving openings in which the first tabs are received, each resilient tab extending into an associated receiving opening and engaging an associated first tab received in the associated receiving opening.

18. The driver assist system recited in claim 11, wherein the housing has a first surface from which the lens extends and a second surface opposite the first surface, the first surface of the housing being engaged by only the edges of the bracket walls, the resilient tabs engaging the second surface of the housing at the first tabs and urging the first surface of the housing into engagement with the edges of the bracket walls, the resilient arms having detents that engage the second surface of the housing at the at least one second tab.

19. The driver assist system recited in claim 11, further comprising a plurality of projections, each projection extending from an associated edge of an associated bracket wall into an associated notch of the housing.

20. A driver assist system for a vehicle, comprising:
a camera having a housing that includes a first surface from which a lens extends and a second surface opposite the first surface, the housing including at least one first tab separated from at least one second tab by a plurality of notches in the housing, the at least one first tab being configured to be spaced closer to a vehicle window than the at least one second tab;
a mounting bracket having a mounting wall connectable with the vehicle window, the mounting wall having a first mounting surface configured to face the vehicle window, and a second mounting surface configured to face away from the vehicle window, at least one bracket wall extending from the second mounting surface and having an edge that engages the first surface of the housing such that the first surface of the housing is engaged by only the edge of the at least one bracket wall;
at least one resilient arm extending from the at least one bracket wall and having a detent that engages the second surface of the housing at the at least one second tab; and
at least one resilient tab extending from the mounting wall and engaging the second surface of the housing at the at least one first tab, the at least one resilient tab urging the first surface of the housing at the at least one first tab into engagement with the edge of the at least one bracket wall and maintaining the at least one first tab engaged to the edge.

\* \* \* \* \*